Dec. 9, 1941.  A. J. MUSSELMAN  2,265,489
BRAKE
Filed Jan. 9, 1941
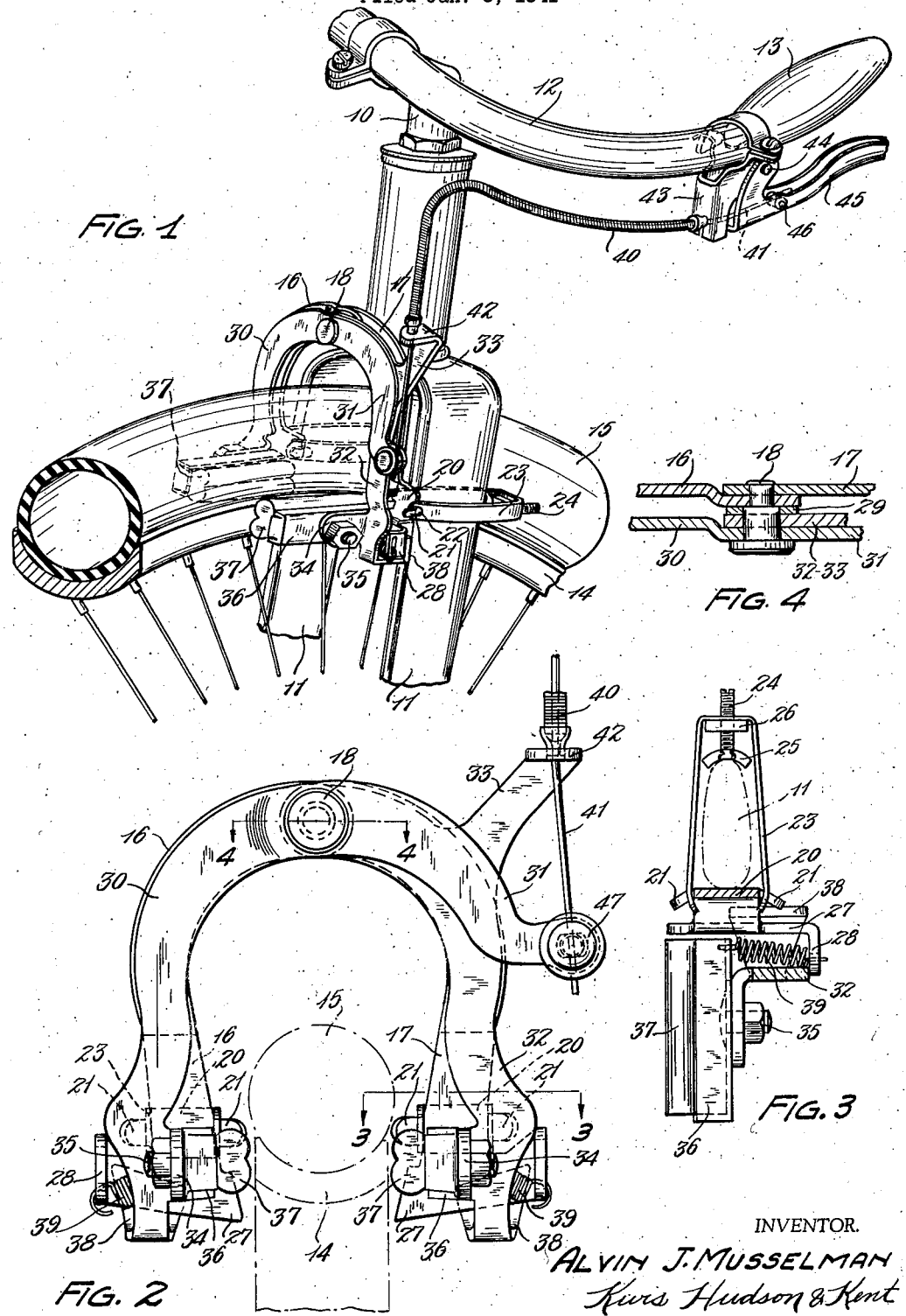
INVENTOR.
ALVIN J. MUSSELMAN
Kwis Hudson & Kent
ATTORNEYS Patented Dec. 9, 1941

2,265,489

UNITED STATES PATENT OFFICE 2,265,489

BRAKE

Alvin J. Musselman, Cleveland Heights, Ohio

Application January 9, 1941, Serial No. 373,781

2 Claims. (Cl. 188—27)

This invention relates to improvements in brakes, being intended primarily for use upon bicycles and motorcycles, and is of the type sometimes referred to as caliper brakes.

One of the objects of the invention is the provision of a brake of this type of comparatively light construction which shall nevertheless be well adapted to take the strains to which it may be subjected.

Another object is the provision of simple and effective means for mounting and for operating the brake readily adaptable to bicycles of varying design.

Other objects and features of novelty will appear as I proceed with the description of that embodiment of the invention which, for the purposes of the present application, I have illustrated in the accompanying drawing, in which Fig. 1 is a fragmental perspective view of a bicycle equipped with a brake embodying the invention.

Fig. 2 is a front elevational view of the brake.

Fig. 3 is a horizontal sectional view taken substantially on the line 3—3 of Fig. 2.

Fig. 4 is a detail sectional view taken substantially on the line 4—4 of Fig. 2.

Referring to Fig. 1, 10 is a handle bar post carried by the front fork 11 of a bicycle. 12 represents the handle bar and 13 is a hand grip on the handle bar. The front wheel rim and tire are shown at 14 and 15.

The bracket by means of which the brake parts are mounted is of horseshoe shape, and is preferably made with two separate legs 16 and 17 connected together at the top by the constricted end of a pivot 18, a shoulder on the pivot engaging the leg 16 and a peened-over engaging the leg 17, whereby these two legs are closely confined at their joint, but are adapted to be moved relatively to each other in order that the bracket may be adjusted for application to forks of different widths.

Near the lower extremities of the bracket legs 16 and 17 there are rearwardly off-set portions 20 which are adapted to abut against the two elements of the fork 11, as shown particularly in Fig. 3. On the opposite sides of the off-set portions 20 there are small forwardly and outwardly projecting tabs 21 which are received in eyes 22 at the forward extremities of a clamping strap 23. At an intermediate point this strap is perforated to receive loosely a screw 24 to one end of which is attached a self-adjusting head 25 formed to engage the fork element 11. A nut 26 on the screw 24 engages the inner side of the strap 23 and thereby forms an abutment for transmitting to the strap the pressure exerted when the screw is tightened for clamping the bracket offset 20 to the fork. The lower end of each of the legs 16 and 17 has a laterally projecting portion 27 with a forwardly extending flange 28.

On the larger forward portion of pivot 18 I mount two levers, a washer 29 being positioned between them and the leg 16 of the bracket. One of these levers comprises a work arm 30 and a power arm 31, while the other comprises a work arm 32 and a power arm 33. A portion of the power arm 33 is common to the work arm 32, these parts being so made for convenience and economy in manufacture. The work arms 30 and 32 are similar except that they are rights and lefts. Each of them near its lower end has a forwardly extending lip 34 to which is attached by means of a bolt 35 a channel shaped holder 36 that carries a brake shoe block 37 made preferably of rubber and adapted to bear against the edge of the wheel rim.

Beyond the lips 34 the work arms 30 and 32 are extended downwardly a short distance, and then bent rearwardly, and finally upwardly, providing what may be termed rearwardly extending hooks 38. These hooks extend below the lower portions 27 of the bracket legs and upwardly behind these lower portions. The upwardly extending portions of the hooks do not ordinarily contact the portions 27 of the bracket, but will make contact under braking strain, thereby relieving the work arms and the pivot 18. In order to retract the brake shoes when braking pressure is relieved, I provide coil springs 39 which are attached at their ends to the flanges 28 and shoe holders 36. The springs are located within the hollow parts of the hooks, and are thereby protected to a considerable extent against damage.

Operation of the brake is by means of a Bowden wire construction consisting of a flexible tubular casing 40 and a wire 41 extending therethrough. The casing is confined at its ends between a flange 42 at the end of power arm 33 and a bracket 43 fastened to the handle bar 12 in convenient proximity to the hand grip 13. On the bracket 43 there is mounted by means of a pivot 44 a hand lever 45 to which is attached at 46 one end of wire 41. The wire at its opposite end extends through a hole in flange 42 down to the free extremity of power arm 31, where it is adjustably mounted by any suitable fastening 47.

When the rider pulls up on the lever 45 a pull is exerted on one end of wire 41, which pull is transmitted to power arm 31. At the same time this pull tends to straighten the wire between the flange 42 and the bracket 43, and with it the tubular casing 40. The upper end of the tubular casing is held against the fixed abutment 43. Consequently this tendency for the casing to straighten out exerts a force against the flange 42, causing it to descend. The two power arms are therefore drawn toward each other and the work arms are swung inwardly with equal force, thereby applying the brakes.

Variations from the described and illustrated structure may be employed. Accordingly I desire it to be understood that the scope of the invention is to be regarded as defined exclusively by the appended claims rather than by the foregoing description or the accompanying illustration.

Having thus described my invention, I claim:

1. In a bicycle brake, a horseshoe bracket adapted to straddle a wheel and to be attached to a fork of the bicycle on opposite sides of the wheel, a pivot carried by said bracket radially outward of the wheel, a pair of levers mounted on said pivot, said levers comprising work arms extending to positions adjacent the ends of said horseshoe bracket and comprising power arms extending laterally on the same side of the pivot, brake shoes carried by the free ends of said work arms adapted to engage the sides of the wheel, Bowden wire means attached to said power arms for rocking the same simultaneously to swing said brake shoes into contact with the wheel, said work arms having rearwardly and upwardly directed hooks at their free extremities arranged to engage rear surfaces of the bracket for taking braking strain, and a retractile spring for each work arm attached to the arm and to the bracket within the adjacent hook.

2. In a bicycle brake, a horseshoe bracket adapted to straddle a wheel and to be attached to a fork of the bicycle on opposite sides of the wheel, a pivot carried by said bracket radially outward of the wheel, brake levers mounted on said pivot, brake shoes carried by said levers adapted to engage the sides of the wheel, means for operating said levers, and means for securing said bracket to the fork of the bicycle comprising rearwardly offset portions of the bracket adapted to engage the two elements of the fork on opposite sides of the wheel, said offset portions comprising outwardly projecting tabs, two U-shaped clamping straps adapted to embrace the respective fork elements, each of said straps having forward extremities rovably connected to said tabs and screw means carried by the rear end of each of said straps for exerting pressure against the rear edge of the adjacent fork elements.

ALVIN J. MUSSELMAN.